Jan. 14, 1964    M. W. LARINOFF    3,117,642
AUTOMOBILE AUTOMATIC-PARKING DEVICE
Filed Nov. 13, 1956    5 Sheets-Sheet 1
FIG.I
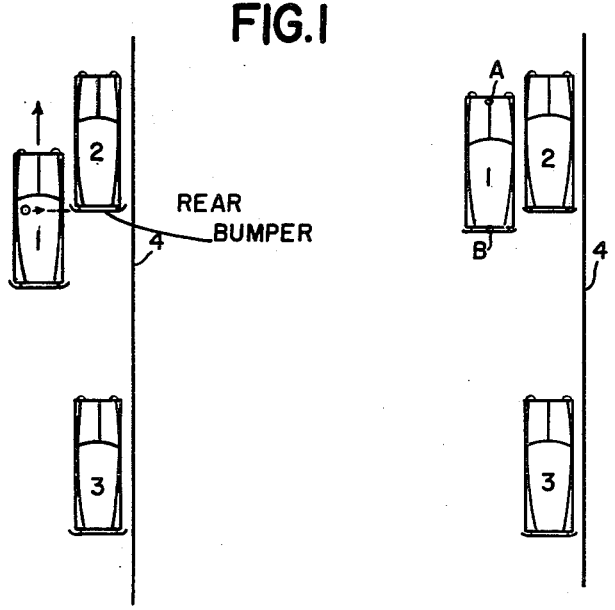
POSITION NO.1
(START)
POSITION NO. 2
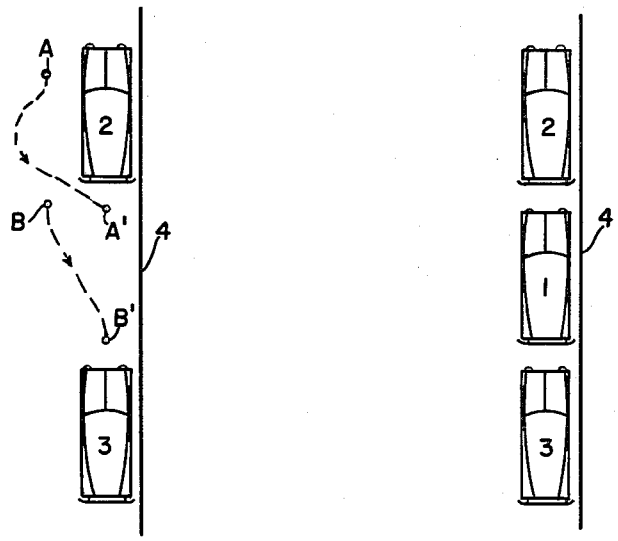
POSITION NO.3
POSITION NO.4
(FINISH)
INVENTOR.
MICHAEL W. LARINOFF
BY
ATTORNEYS

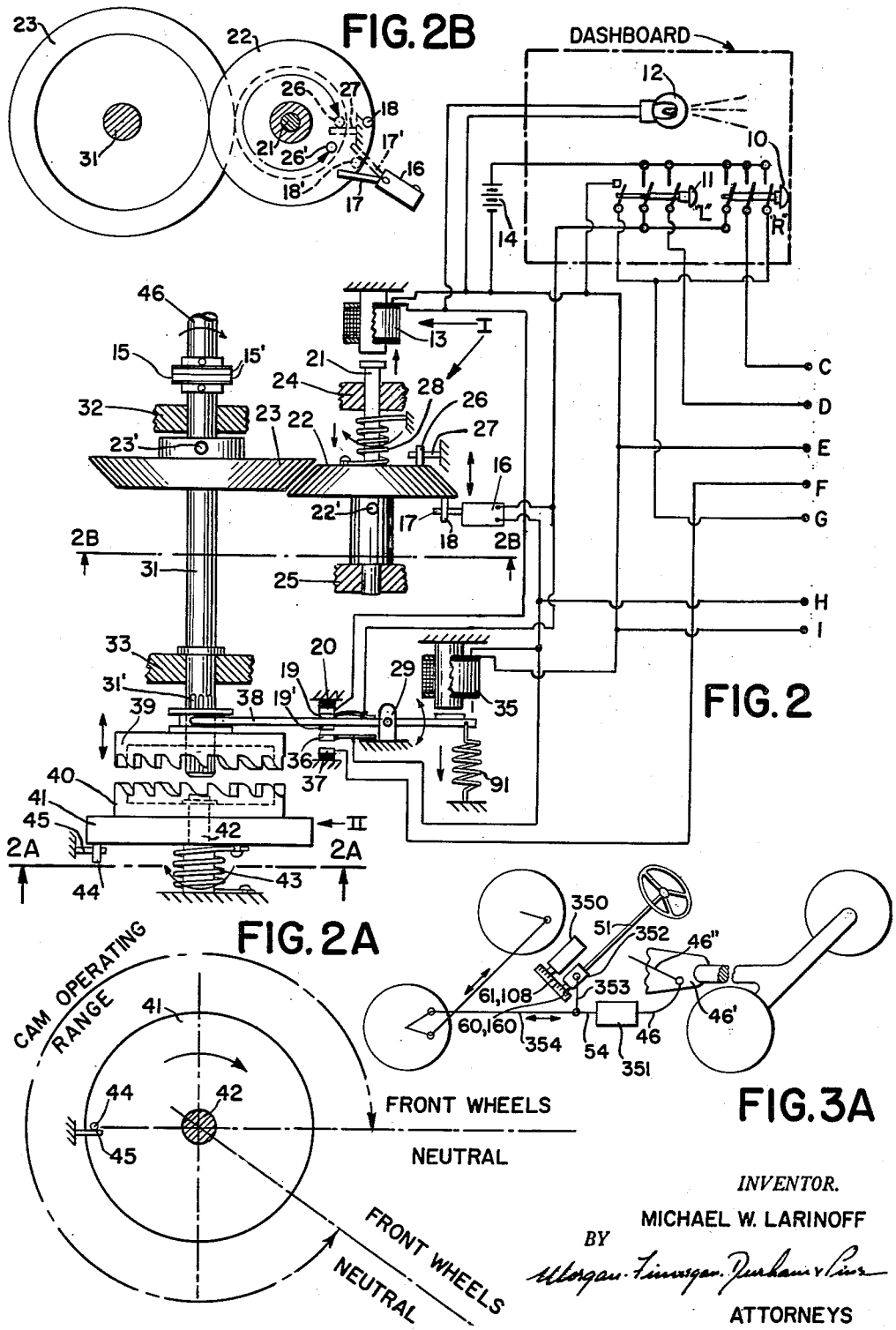

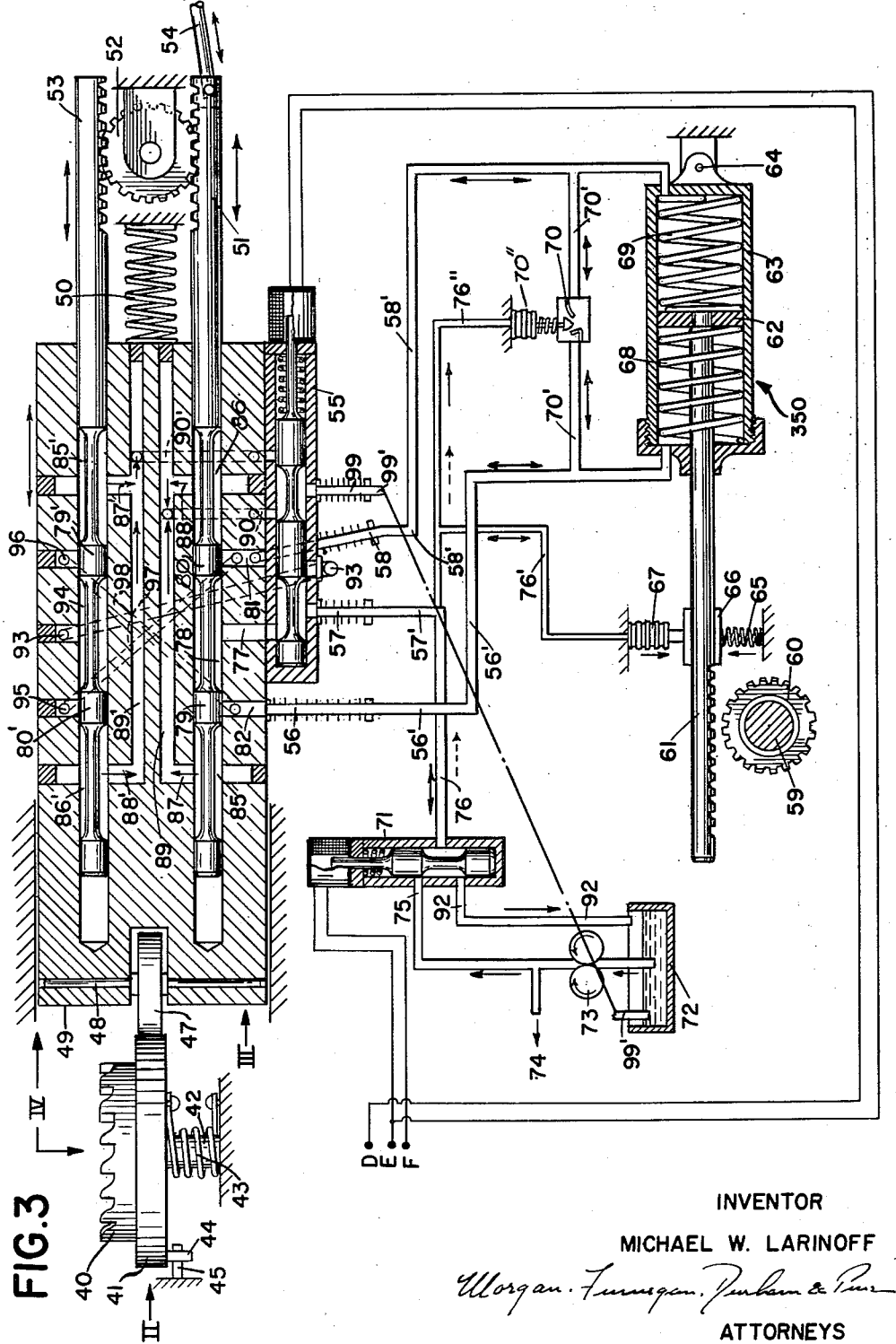

Jan. 14, 1964  M. W. LARINOFF  3,117,642
AUTOMOBILE AUTOMATIC-PARKING DEVICE
Filed Nov. 13, 1956  5 Sheets-Sheet 4
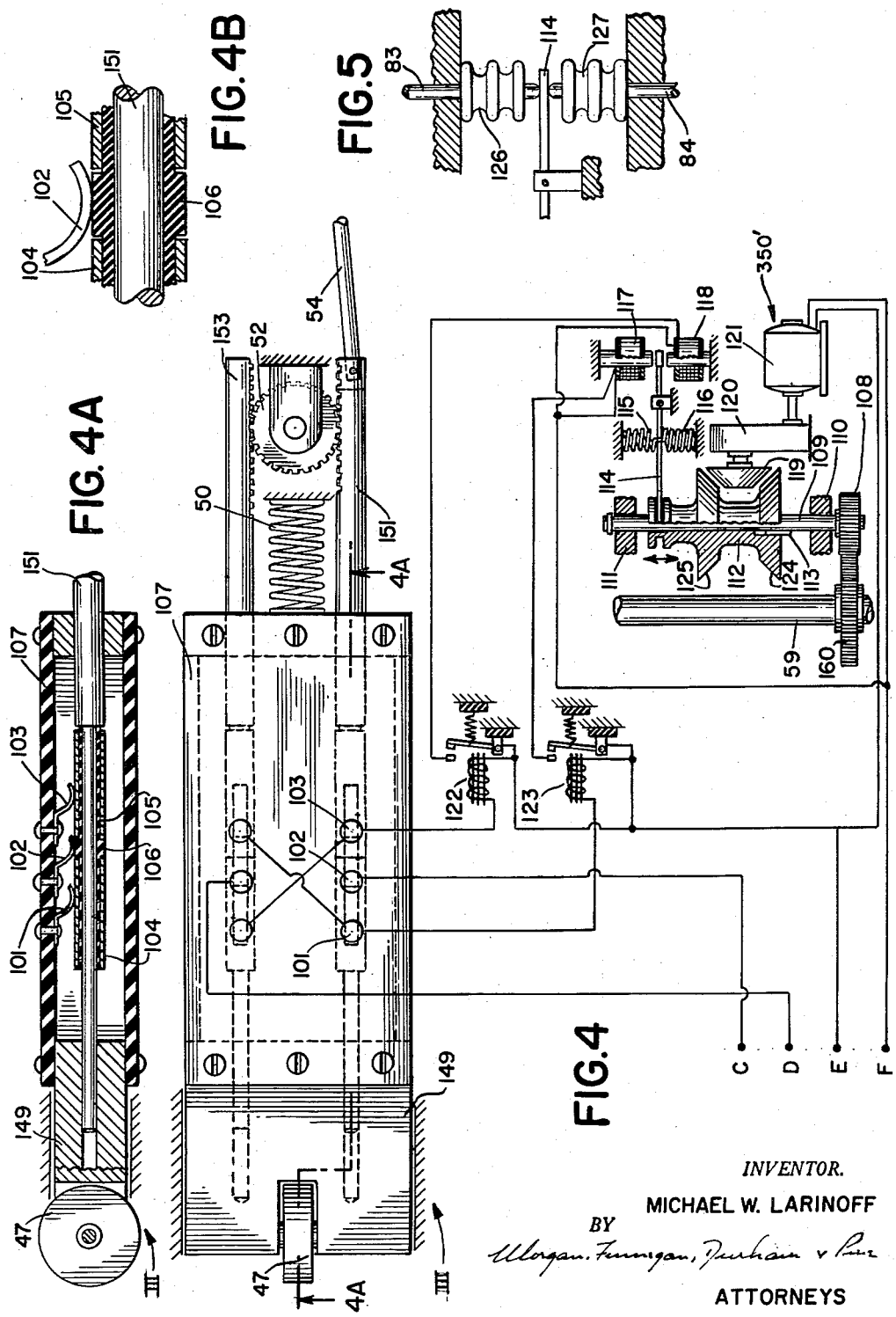
INVENTOR.
MICHAEL W. LARINOFF
BY
ATTORNEYS Jan. 14, 1964     M. W. LARINOFF     3,117,642
AUTOMOBILE AUTOMATIC-PARKING DEVICE
Filed Nov. 13, 1956     5 Sheets-Sheet 5
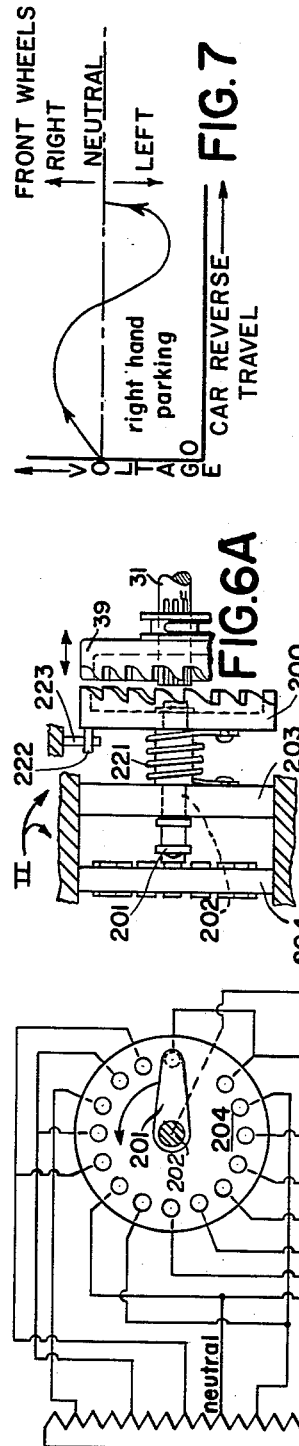
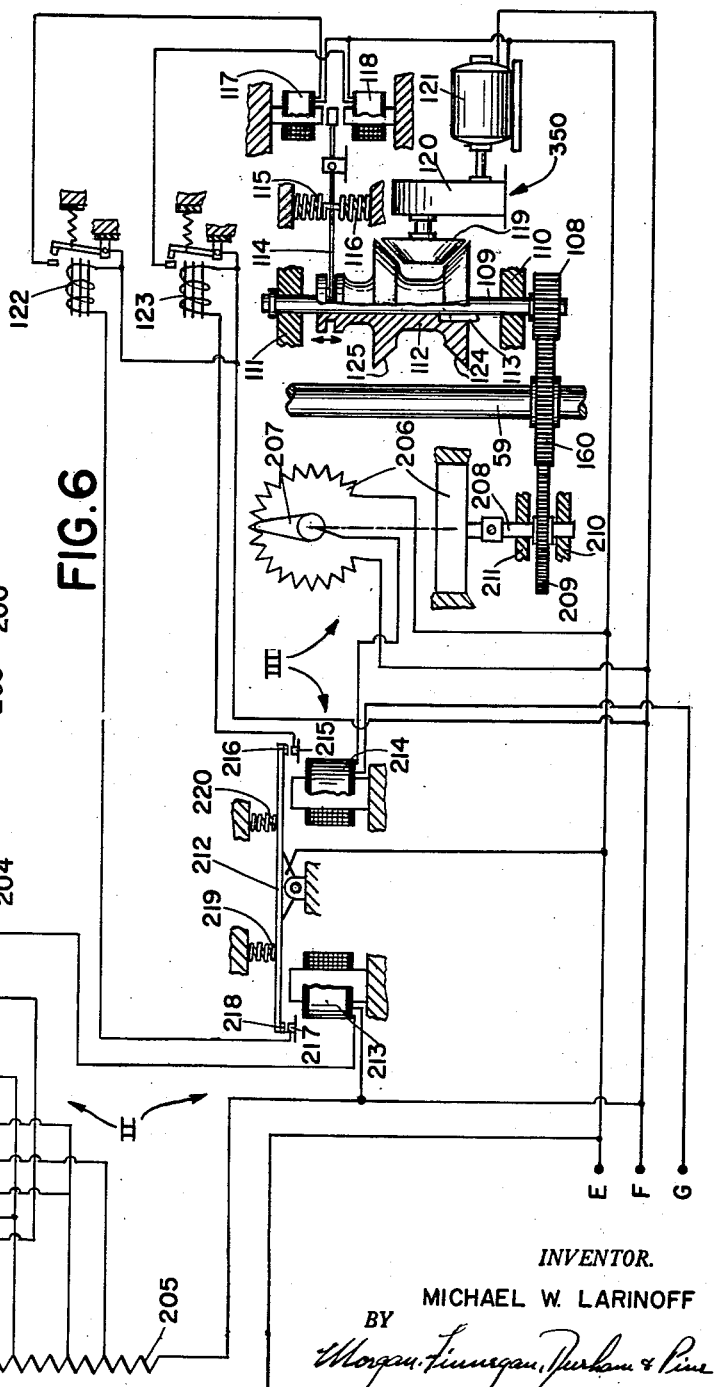
INVENTOR.
MICHAEL W. LARINOFF
BY
ATTORNEYS

3,117,642
Patented Jan. 14, 1964

3,117,642
AUTOMOBILE AUTOMATIC-PARKING DEVICE
Michael W. Larinoff, Brooklyn, N.Y.
(927 Darien Terrace, Teaneck, N.J.)
Filed Nov. 13, 1956, Ser. No. 621,634
17 Claims. (Cl. 180—1)

This invention is an automobile accessory, sometimes hereinafter called the "Park-Pilot," which has for an object the automatic-parking of an automobile in a restricted space on either the right or left hand sides of the street. The device is essentially an automatic-pilot which first positions and then automatically steers the automobile into a restricted parking space such as between two automobiles already parked parallel with the curb.

Objects and advantages of the invention will be set forth in part hereinafter and in part will be obvious therefrom, or may be learned by practice with the invention, the same being realized and attained by means of the combinations, improvements and instrumentalities pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The problem of parking a car in a restricted space is basically two-fold; the first is to know where to stop the forward moving vehicle in relation to the already parked cars before shifting in reverse and the second is to synchronize the steering wheel manipulations with the vehicle's backward-travel movements. There is a definite pattern of steering wheel operation relative to car movement which will place the car in the smallest possible parking space with but a single movement of the car from the traveling-lane to the parking-lane. The present hit-or-miss method of parking requires the vehicle operator to make one or more movements of the car from the traveling-lane to the parking-lane before the car is satisfactorily parked. The number of attempts is a function of the operator's experience in handling the vehicle, the size of the restricted parking space and the location of the parking space such as the right- or left-hand side of the street.

The advantages of this device are that it is time and labor saving particularly in congested areas where the inexperienced or even the seasoned driver sometimes hesitates to park in an available but very-much restricted space for reason of holding up traffic if his first attempt of backing into the space is unsuccessful. In addition, it protects automobiles from possible damage during parking such as dented fenders, bent bumpers and damaged tire walls.

In accordance with this invention, the "Park-Pilot," from the driver's viewpoint, consists of two push buttons (electric switches) and a pilot light mounted conveniently on the dashboard of the car. One of the push buttons is marked "R" for right-hand street parking and the other marked "L" for left-hand street parking. The pilot light is used in properly positioning the forward-moving vehicle prior to automatic parking. The pilot-light is not necessary if the vehicle permits complete automatic operation of its brakes and gear shifting mechanism.

The driver's operations are as follows:

When moving in the traveling-lane in preparation for parking, the driver slowly approaches the empty parking space with his car traveling parallel to, and a predetermined distance from, the parked cars. In passing the empty parking space he prepares to sight the rear bumper of the car parked ahead. When his line of sight is directly in-line with the rear bumper of the parked car (looking perpendicular to his line of travel), he presses one of the two parking buttons (marked "R" and "L") and keeps it manually depressed during the entire parking operation. The dashboard pilot light goes on when the button is depressed.

The car is continued to be driven forward slowly until the pilot light goes out. At this signal the car is stopped and the transmission gear-shift is placed in reverse. The application of the brakes and reverse gear shifting can be made automatic with this invention if the braking and shifting mechanism is of the electric or hydraulic control type depending upon the design or make of car.

The automatic-parking device is now in complete control of the vehicle's steering mechanism. The driver relinquishes control of the steering wheel and operates only the foot throttle and brake as necessary. The car is driven in reverse until it is against the curb properly parked and with the wheels automatically brought back to neutral. The driver then releases the parking button, places the power transmission gear in forward position and drives ahead slightly to center his car between the two parked cars.

The "Park-Pilot" consists essentially of three major elements:

*a.* Car Initial-Positioner
*b.* Automatic-Pilot
*c.* Steering-Mechanism Operator The car initial-positioner enables the vehicle operator to properly position his car with respect to the parked car ahead prior to the automatic-parking operation. The parked car acts as a position-guide and the initial-positioner insures that the automatic-parking operation starts at the correct distance forward of the parked car's rear bumper thereby parking the vehicle in the minimum possible distance behind the parked car.

The automatic-pilot follows the car's rearward parking movements and prescribes a defined and synchronized position of the car's steering wheel mechanism. For each exact geographical position of the car relative to the ground, the automatic-pilot prescribes to the steering-mechanism operator a predetermined and defined position of the steering-wheels.

The steering-mechanism operator positions the steering-wheels and is controlled by the automatic-pilot.

Of the drawings:

FIG. 1 is a series of plan position diagrams of a car being parked in a restricted space between two other parked vehicles;

FIG. 2 is a diagrammatic view of car initial-positioner and automatic-pilot cam in accordance with this invention;

FIG. 2A is a diagrammatic view of the automatic-pilot cam taken along the line 2A—2A of FIG. 2;

FIG. 2B is a view taken along the line 2B—2B of FIG. 2;

FIG. 3 is a diagrammatic view with parts in section of a hydraulic-type automatic-pilot and steering-mechanism operator of this invention;

FIG. 3A is a diagrammatic view of typical car linkage connections in accordance with this invention;

FIG. 4 is a diagrammatic view with parts in section of an electric switch type automatic-pilot and steering-mechanism in accordance with a modification of this invention;

FIG. 4A is a diagrammatic view of the automatic-pilot of FIG. 4 taken along the line 4A—4A of FIG. 4;

FIG. 4B is an enlarged diagrammatic view of a section of the switch shown in FIG. 4A;

FIG. 5 is a diagrammatic view of an element which permits combining a hydraulic-type automatic-pilot with an electric-type steering-mechanism operator;

FIG. 6 is a diagrammatic view of an electric-potentiometer-type automatic-pilot and steering-mechanism operator in accordance with a modification of this invention;

FIG. 6A is a view in side elevation of the multipoint selector switch of FIG. 6; and FIG. 7 is a graphical illustration of the approximate voltage characteristic of the potentiometer-type programming element of FIG. 6 for right-hand street parking.

The invention described in detail herein involves the use of mechanical, electrical and hydraulic components. More specifically, FIG. 3 presents essentially a hydraulic design, FIGS. 4, 4A and 4B an electrical design, FIG. 5 an element which would combine a hydraulic design with an electrical design, and FIGS. 6, 6A and 7 an alternate electrical design. The descriptions are but specific embodiments of the invention and it is to be distinctly understood that the individual components and details are not limited to these specific illustrations. In addition, where the forward parked car's rear bumper is used as a position guide, the rearward parked car's front bumper could be used. Similarly, the guide does not have to be a bumper, it can be any other component or structure of the parked vehicle.

Reference made to the word "normal" in the following description is intended to refer to the condition the mechanism is in when the automatic-parking device is not in operation.

*Car Initial-Positioner*

The car initial-positioner, shown in FIG. 2, enables the vehicle operator to properly position his car with respect to the parked car ahead prior to the automatic-parking operation. It includes vehicle-driven forward-travelling measuring means adapted to be set in operation by the operator for left- or right-hand parking at a prescribed vehicle position relative to a parked vehicle, for measuring a predetermined distance the vehicle must move forward parallel to the parked vehicle in accordance with a prescribed parking course before the moving vehicle is intended to be stopped and shifted into reverse for reverse-travel parking movement along said course. It is driven by shaft 46 which is connected to some part (not shown) of the vehicle that continually rotates (such as the speedometer shaft) with car travel or movement. Shaft 31, coupled to shaft 46 through friction clutch 15 having the opposed contacting clutch discs 15', rotates in bearings 32 and 33 mounted in the frame of the mechanism. Friction cone 23 is keyed and fastened to shaft 31 by pin 23' while clutch element 39 moves axially on, and is driven by, the splines 31' on the free end of shaft 31. Clutch element 39 is moved axially by shift lever 38, which is pivoted on mounting 29 and actuated in one direction by spring 91 and in the opposite direction by solenoid 35. Solenoid 35 and the free end of spring 91 are fastened to the frame of the mechanism. Shift lever 38 carries spring-mounted contact 19 and fixed contact 19', each being in electrical conductivity with the other and insulated from the frame of the mechanism. Fixed contacts 20 and 37 and spring-mounted contact 36 are each fastened to, and insulated from, the frame of the mechanism.

Friction cone 22 is keyed and fastened by pin 22' to shaft 21 which rotates and moves axially in bearings 24 and 25 mounted in the frame of the mechanism. Shaft 21 can only rotate through an angle less than 360° as determined by stop 26 (fixed to friction cone 22) and stop 27 (attached to frame). Shaft 21 is subjected to the axially-directed magnetic force of solenoid 13 and the forces of torsion-compression spring 28 which tend to return it to a normal position (friction cone 22 separated from friction cone 23 and stop 26 against stop 27). The normally-open momentary-contact switch 16 is attached to the frame and is actuated through its lever 17 by pin 18 mounted on friction cone 22. This switch is only closed by pin 18 when friction cone 22 has rotated through its prescribed angle and before stop 26 strikes stop 27. The position of the lever 17, pin 18, and stop 26 in the closed position of switch 16, are indicated in dash-dot outlines at 17', 18', and 26', respectively, in FIG. 2B.

The operation of the car initial-positioner is as follows: Assuming the driver in car No. 1 has elected to park on the right-hand side of the street, as shown in FIG. 1, he slowly approaches the empty parking space, No. 4, with his car traveling parallel to, and at a predetermined distance from, parked cars Nos. 2 and 3. In passing the empty parking space he prepares to sight the rear bumper of car No. 2 parked ahead. When his line of sight is directly in line with the rear bumper of the parked car, as shown in Position No. 1, FIG. 1, he presses parking button 10 (marked "R"), FIG. 2, and continues to slowly drive ahead. Parking button 10 is kept manually depressed during the entire parking operation.

Parking button 10, FIG. 2, is a momentary-contact type of electrical switch which maintains contact so long as it is manually depressed. Closing parking switch 10 causes dashboard pilot light 12 to go on and solenoid 13 to become energized. The current flow-path, starting from the top terminal of car battery 14, FIG. 2, is a follows: Current flows through parking button 10, spring-mounted contact 19, fixed contact 20, solenoid 13 and back to the bottom terminal of the battery, thus completing the circuit. Pilot light 12 in parallel with the solenoid, goes on.

When solenoid 13 becomes energized its attracting magnetic force moves shaft 21 axially thereby causing friction cone 22 to contact rotating friction cone 23. As the car travels forward from Position No. 1, FIG. 1, friction cone 23 drives friction cone 22. When the car reaches Position No. 2, which is a prescribed distance from Position No. 1, switch lever 17 is moved by pin 18 through the rotating movement of friction cone 22 thereby closing switch 16 and energizing solenoid 35. Energized solenoid 35 moves lever 38 thereby closing contacts 19' and 36 and opening contacts 19 and 20. Opening contacts 19 and 20 causes pilot light 12 to extinguish, solenoid 13 to de-energize, friction cone 22 to separate from 23 under the action of torsion-compression spring 28, shaft 21 to rotate to its normal position with stop 26 against stop 27, and switch 16 to resume its normally-opened position. Contacts 19' and 36 electrically parallel switch 16 so that when switch 16 opens, these contacts then being closed continue to keep solenoid 35 energized.

When shift lever 38 was first actuated by solenoid 35, it not only closed contacts 19' and 36 and opened contacts 19 and 20 but also moved jaw clutch element 39 in the direction of clutch element 40. Clutch element 39 can not engage clutch element 40 at this stage of operation since the car is traveling in a forward direction and the jaws of the clutch are designed to engage only when the vehicle is traveling in reverse. Contact 36 touches contact 37 only when jaw clutch 39 completely engages jaw clutch 40.

The driver stops the forward travel of the car at the visual signal from pilot light 12 (extinguishes when car reaches prescribed Position No. 2, FIG. 1) and places the transmission gear shift in reverse operation. The function of the car initial-positioner is now complete as its only purpose was to place the car a definite distance ahead of the rear bumper of the parked car. With the transmission shifted to reverse position, the car is ready for automatic parking.

The application of the brake and reverse gear shifting at car Position No. 2 can be made completely automatic through electrical connections H—I, FIG. 2, if the vehicle's brakes and gear shifting mechanism are of the electric or hydraulic control type, depending upon the design of the car. Connection H—I could energize electric relays that would control the braking and gear shifting mechanisms of the car in proper sequence when solenoid 35 become energized.

From the foregoing description of the car initial positioner with its forward-travel measuring means I, it will be seen that the friction cone 23 is an element of vehicle-driven rotary drive means which, as shown, also includes the axially-aligned shafts 31 and 46 coupled by the friction clutch 15, a normally stationary rotary driven member comprised of jaw clutch element 40 and cam 41 integral therewith, and a drive member comprised of the rotary jaw clutch element 39 for driving the normally-stationary driven-member. The shift lever 38 serves as a means for effecting driving engagement of the clutch element 39 with clutch element 40 and thus of the driving member with the normally-stationary driven member, at the termination of the forward-travel movement of the vehicle. The friction cone 22 carrying the switching pin 18, together with the normally-open momentary contact switch 16, provides rotary electric switching means adapted to be rotated by the friction cone 23 of the vehicle-driven rotary drive means during the forward-travel movement of the vehicle for energizing the shift-lever solenoid 35 and thus actuating the shift lever (driving engagement means) at the termination of the forward-travel movement of the vehicle. In addition, the solenoid 13 which is operator-controlled by the parking switch or button 10 provides operator-controlled means for initially placing, and temporarily holding, the above-mentioned rotary electric switching means in driving engagement with the above-mentioned rotary drive means. The forward-travel measuring means I is comprised of the rotary electric switching means and the operator-controlled means.

*Hydraulic-Type Automatic-Pilot and Steering-Mechanism Operator*

The rearward movement of the vehicle from Position No. 2 drives jaw clutch 40, FIG. 3, through shaft 46 and jaw clutch 39. Jaw clutch 40 and cam 41 are integral with each other and rotate on shaft 42 (fixed to frame). In normal position, torsion-spring 43 brings cam 41 to neutral position with stop 44 (fastened to cam 41) against stop 45 (attached to frame).

The actual contour of cam 41 is not shown in FIG. 2. The cam shape is so designed that when operating as an element of the automatic-pilot controlling the steering-mechanism operator, it prescribes a defined and synchronized steering wheel position for every new position of the car in its rearward travel. The cam prescribes a definite steering wheel movement, both in direction and magnitude, for each point of car travel from A to A' (car front) or B to B' (car rear) as shown in Position No. 3, FIG. 1. The contour of cam 41 is such that at the start and end of its cycle (cam-operating range less than 360°), the steering wheels are prescribed to be in a straight-ahead or neutral position as shown in FIG. 2A.

The automatic-pilot of the embodiment depicted in FIG. 3 is essentially a hydraulic valve whose ports are opened and closed by movements of both the valve body and valve stem. The position of valve body 49, FIG. 3, is controlled by cam 41 while the position of valve stem 51 is controlled by link 54 which is attached to and is responsive to the movements of the steering wheel mechanism of the car.

FIGURE 3A illustrates the typical car linkage connections to the mechanisms presented in FIGS. 2 and 3 or, alternatively, FIGS. 2 and 4. Steering wheel shaft 59 drives steering gears in the box 352 which gears rotate pitman arm 353 that causes drag link 354 to position the front wheel steering linkage of the conventional four wheel vehicle. Link 54, of FIGS. 3 and 4, is shown connected to the steering linkage at pitman arm 353. Shaft 46 of FIG. 2 is here depicted as a flexible shaft and connected to one of the output shafts of dual-drive gear box 46' which is driven from transmisison components direct connected to the rear wheels of the conventional vehicle; the second output of dual-drive gear box 46' is connected to speedometer shaft 46". The link connection of steering mechanism operator 350 to gears 60 or 160 is either rack 61 of FIG. 3, or gear 108 of FIGS. 4 and 6. In summary, shaft 46 drives the initial-positioner and automatic-pilot 351 which positions the forward traveling vehicle prior to its rearward parking movements and prescribes the position of the steering wheels during the vehicle's rearward parking movements; link 54 (or its equivalent, gear 209 of FIG. 6, not shown in FIG. 3A) controls the signals that describe the actual position of the steering wheels; and steering mechanism operator 350 positions the steering wheels, either directly or indirectly, in accordance with impulse signals received for automatic pilot 351.

Circular cam-follower 47 and shaft 48 are integral with valve body 49. Cam follower 47 bears against cam 41 by the action of spring 50. Valve body 49 is restrained by the mechanism frame on four sides and permitted to move only endwise in accordance with the position of cam 41. Valve stem 51 is attached directly to link 54 while valve stem 53 moves in opposite direction to valve stem 51 through the action of reversing-gear 52. Attached to valve body 49 is a solenoid operated valve 55 having flexible oil-piping connections 57 and 99, and flexible oil-piping connections 56 and 58. Valve 55 is a dual type solenoid operated two-way valve which is shown in its normal and right-hand street parking position in FIG. 3 in which oil passage 77 is opened to connection 57, and passage 90 is open to connection 99. During left-hand street parking the valve solenoid is energized and the valve stem moves such that passage 93 is open to connection 57 and passage 90' is open to connection 99. Valve stem 51 controls oil flow to the steering-mechanism operator when parking on the right-hand side of the street while valve stem 53 is in control when parking on the left-hand side of the street.

The hydraulic-type automatic-pilot is an impulse-generating pilot means IV responsive to reverse-travel parking movements of the vehicle, for generating position-prescribing impulses operative to effect a predetermined steering-wheel position for each geographical position of the vehicle in its reverse-travel movements. As depicted in FIGS. 2 and 3, it comprises vehicle driven course-programming means II having a normally stationary rotary driven-member comprised of jaw clutch element 40 and cam 41 integral therewith, the driven member and hence the cam 41 being positionable in response to said parking movements, for programming the generation of said position-prescribing impulses in accordance with said prescribed parking course. It further comprises a position-sensing means III which, as embodied in FIG. 3, is essentially in the form of a hydraulic valve 49—51, having the movable valve body 49 controlled by the cam 41, and having a valve stem 51 controlled by link 54 which is attached to and is responsive to the movement of the steering wheel mechanism of the vehicle. The position-sensing means III is responsive to the position of both the cam 41 and the steering wheels for generating said position-prescribing impulses in accordance with said parking course and for interrupting said impulses at each said predetermined steering wheel position, whereby the steering wheels may be caused to be turned by said impulses, until their position is in balance with the position of the cam 41 at which point said impulses stop and steering-wheel movement ceases. This balance is only momentary since as the position of the cam 41 is changed by the steady rearward movement of the vehicle, the hydraulic valve 49—51 is continuously sending impulses tending to restore a balance between the steering wheel position and the position of the cam 41 thereby to cause the steering wheels to follow automatically the parking movement prescribed by the cam 41.

The steering-mechanism operator 350 as depicted in FIG. 3 is essentially a double-acting hydraulic ram operating the steering wheel shaft through a rack and pinion connection. Steering wheel shaft 59 and its driving pinion 60 are rotated by rack 61 which is attached to piston 62 operating in cylinder 63. In normal driving operation when the automatic parking device is not in use, rack 61 is not engaged with pinion 60. Cylinder 63 and rack 61 pivot about connection 64 during the engaging-disengaging processes. Spring 65, acting through sleeve 66, forces the rack to disengage when the parking device is not in use, while hydraulic bellows 67 function to engage rack 61 with pinion 60 when the device is used. In normal position, valve 70 is open and piston 62 is in the center of cylinder 63 by the action of springs 68 and 69. The function of valve 70 is to permit oil to flow from one piston chamber into the other in normal position under the action of centering-springs 68 and 69 acting on piston 62.

The mechanical, electrical and hydraulic operations of the automatic-pilot and steering-mechanism operator during right-hand street parking are as follows: When jaw clutch 39 completely engages jaw clutch 40, FIG. 2 (immediately after the car starts its reverse travel from Position No. 2), contacts 36 and 37 are closed in consequence thereby opening solenoid-operated two-way valve 71, FIG. 3, through electrical connections E—F. The valve 71 as shown in FIG. 3 is in its unenergized normally closed position wherein oil passage 76 is open to drain 92. In its energized position oil supply line 75 is open to line 76 and drain 92 is closed. This is the main-valve supplying hydraulic control-oil to the device from oil pump 73. Oil pump 73, oil reservoir 72 and oil-line header 74 may be part of the existing hydraulic system of the car supplying oil for other purposes. Hydraulic oil under pressure enters valve 71 through line 75 and flows through lines 76 and 57', flexible connection 57, solenoid valve 55, valve-body passage 77 and enters annular chamber 78. In addition, oil from line 76 flows through line 76' where it enters bellows 67 engaging rack 61 with pinion 60; also line 76" where it enters bellows 70" of valve 70 to close this valve.

During automatic parking the steering wheels are being automatically continuously repositioned in response to the cam-controlled end-wise movement of the valve body 49. Depending on the position of the valve body 49, oil flows from annular chamber 78 through either port 81 or 82 and line 58—58' or 56—56', as the case may be, with the result that piston 62 is moved hydraulically, steering wheel shaft 59 rotated, link 54 moved and valve stem 51 repositioned by the latter to the continuously sought neutral position. The automatic-pilot device shown in FIG. 3 is in neutral position (steering wheels neutral) with the steering wheel position synchronized with cam 41 for automatic parking. In this neutral position no hydraulic oil flows between the automatic-pilot and the steering-mechanism operator because valve stem lands 79 and 80, of valve stem 51, cover oil-flow ports 82 and 81, respectively.

Hydraulic oil flowing into one of the chambers of cylinder 63 forces oil out of the opposite chamber into either line 58' or 56', and recycles it seriatim via connection 58 or 56, passage 81 or 82, annular chamber 86 or 85, internal passage 88 or 87, header 89, port 90, flexible connection 99 and return line 99' back to oil reservoir 72.

When the car is driven up against the curb, the driver releases parking button 10 which de-energizes solenoid 35, FIG. 2, with the result that spring 91 forces clutch element 39 to separate from clutch element 40 which opens contacts 19', 36 and 37 and de-energizes spring-pressed supply valve 71, FIG. 3, shutting off oil supply to the device and opening line 76 to drain line 92. Spring 65 acting on sleeve 66 forces rack 61 away from pinion 60 by pivoting cylinder 63 about connection 64. Valve 70 being relieved of oil pressure on its operating bellows, opens, connecting both ends of cylinder 63 to a common oil passage 70' with the result that compression springs 68 and 69 force piston 62 into normal position which is the center of cylinder 63. Oil from bellows 67 and the bellows 70" of valve 70 is forced out by spring-action via line 76' and 76", respectively to drain-line 92. Cam 41 is returned to its normal position by torsion spring 43, FIG. 2, with pin 44 (mounted on cam 41) against pin 45 (attached to frame). All components are thus brought back to their normal position ready for the next automatic-parking cycle.

For left-hand street parking, button 11, marked "L," FIG. 2, is depressed. All operations are the same as for right-hand parking except that the dual type solenoid-operated two-way valve 55, FIG. 3, becomes energized through connections D—E. This action closes port 77 and permits oil to flow from line 57 through pipe 93 into annular chamber 94. All hydraulic oil flow is now controlled by valve stem 53 while valve stem 51 becomes hydraulically inoperative. Steering wheel movement is transferred from link 54, to valve stem 51, through reversing-gear 52 and into valve stem 53. Reversing-gear 52 causes valve stem 53 to move in a direction opposite to the movement of valve stem 51. This reversed motion is necessary because the steering mechanism moves in opposite directions when parking on opposite sides of the street. Oil flow from chamber 94 to cylinder 63 is through ports 95 or 96, lines 97 or 98, 58 or 56 and 58' or 56'.

Hydraulic oil flowing into one of the chambers of cylinder 63 forces oil out of the opposite chamber into either line 56' or 58', and recycles it seriatim via annular return chamber 85' or 86', internal return passage 87' or 88', header 89', port 90' and return line 99 and 99' back to oil reservoir 72. In the neutral position of valve stem 53, no hydraulic oil flows between the automatic-pilot and the steering-mechanism operator because valve stem lands 79' and 80' cover oil flow ports 95 and 96.

There are several safety features built into the design to protect the driver and the equipment in the event of maloperation.

A. The automatic parking mechanism cannot operate while the car is in forward motion even though parking buttons 10 or 11 are depressed. Spiral jaw clutch 39 can only engage jaw clutch 40 when the car is moving in reverse direction by virtue of the shape of its teeth. Solenoid-operated oil supply valve 71 is opened only when jaw clutch 39 completely engages clutch 40 thereby closing contact 37 and completing circuit E—F.

B. Rack 61 of the steering-mechanism operator device does not engage the car's manual steering mechanism during normal driving. It will engage only when the car is traveling in reverse and parking buttons 10 or 11 are manually depressed.

C. In the event the empty parking space is larger than required and backward travel is continued beyond what is necessary, cam pin 44 will come up against pin 45, FIG. 2, and stop further rotation of shaft 31. However, shaft 46 will continue to rotate by slippage in friction clutch 15 between the pair of opposed contacting clutch discs 15'. This clutch prevents possible damage to the stop pins and related equipment.

*Electric-Switch Type Automatic-Pilot and Steering-Mechanism Operator*

An electric design of automatic-pilot and steering-mechanism operator is shown in FIGS. 4, 4A and 4B. All of the elements shown in FIG. 2 are retained while all of the elements shown in FIG. 3 are now substituted by the elements in FIG. 4. In this design the automatic-pilot is essentially a double-pole double-throw electric switch. The switch body 149, FIG. 4, is controlled by cam 41, FIG. 2, while the switch-blade 151 is controlled by link 54 which is fastened to the steering-mechanism of the car.

Circular cam-follower 47 is integral with switch body 149 and bears against cam 41, FIG. 2, by the action of spring 50. Switch body 149 is restrained by the frame of the mechanism on four sides and permitted to move only endwise in accordance with the position of cam 41. Switch-blades 151 and 153 are supported and guided in switch body 149 for parallel reciprocation. Spring contacts 101, 102 and 103 are insulated from each other and from switch body 149 by insulation 107 and bear against sliding sleeve-type contacts 104 and 105. Sleeve-type contacts 104 and 105 on switch-blade 151 are insulated from each other and from the switch-blade by insulation sleeve 106. Switch-blade 151 is in control during right-hand street parking while switch-blade 153 is in control during left-hand street parking. Switch-blade 153 moves in opposite direction to switch-blade 151 through the action of reversing gear 52.

The steering-mechanism operator 350' is essentially an electric motor operating the steering wheel shaft through a reduction gear and a reversing cone-type clutch. Steering wheel shaft 59 and its driving gear 160 are rotated by pinion gear 108. Pinion gear 108 is fastened to shaft 109 which rotates in bearings 110 and 111 mounted in the mechanism frame. The cone-type reversing-clutch 112 drives shaft 109 through key 113 and is free to move axially on the shaft in accordance with the movements of shift-lever 114. Shift-lever 114 is held in neutral position by springs 115 and 116 and is caused to move by the action of a magnetic force exerted by either solenoid 117 or 118. Cone clutch assembly 112 is caused to rotate by being forced against driving cone 119. Electric motor 121 drive cone 119 through a speed reduction gear 120. Relays 122 and 123 protect electric contacts 101, 102, 103, 104 and 105 from arc damage by current flow. Electric motor 121 and reduction gear 120 could be replaced by a shaft drive of cone 119 direct from the vehicle's engine crankshaft, camshaft, distributor drive, etc.

The mechanical and electrical operations of the automatic-pilot and steering-mechanism operator of FIGS. 4 and 4A during right-hand street parking are as follows: When jaw clutch 39 completely engages jaw clutch 40, FIG. 2, contacts 36 and 37 are closed thereby starting electric motor 121 through electrical connections E—F. In addition, assuming switch blade 151 has been moved to right or left as viewed in FIG. 4, current also flows through connection C, brush contact 102, sleeve contact 104 or 105, brush contact 101 or 103, relay 123 or 122 and then to connection E to complete the circuit to battery 14, FIG. 2. When relay 123 or 122 closes, it completes a circuit which energized solenoid 117 or 118 which magnetically moves shift lever 114, engages cone 124 or 125 of cone clutch assembly 112 with cone 119 and drives shaft 109, gears 108 and 160 and steering wheel shaft 59, either clockwise or counterclockwise as the case may be.

The automatic-pilot device shown in FIG. 4 is in neutral position with the steering wheel position synchronized with cam 41 for automatic-parking. Spring-contact 102 does not contact either of sleeve-contacts 104 or 105 but rides on insulation 106, as shown in FIG. 4B. In this position neither relays 122 or 123 nor solenoids 117 or 118 are energized and shift-lever 114 and cone clutch assembly 112 are in neutral position with shaft 109 stationary. However, in the process of automatic-parking the steering wheels are being continuously repositioned. Switch-blade 151 is electrically closing either relay 122 or 123 thereby moving cone face 124 or 125 against cone drive 119. Moving cone face 124 against cone drive 119 causes shaft 109 to turn clockwise while moving cone face 125 against cone drive 119 causes shaft 109 to turn counterclockwise, or vice versa. Switch-blade 151 moves with the front steering wheels and is therefore continuously seeking the neutral position in which the steering wheels are in their neutral position as determined by cam 41 with spring-contact 102 touching insulation 106 in-between sleeve contacts 104 and 105.

When the car is driven against the curb, the driver releases parking button 10 which de-energizes solenoid 35, FIG. 2, with the result that spring 91 forces clutch 39 to separate from clutch 40 which opens contacts 19', 36 and 37 and stops electric motor 121. Cam 41 is automatically returned to its normal position by torsion spring 43 with pin 44 (mounted on cam 41) against pin 45 (attached to frame). All components are thus brought back to their normal position ready for the next automatic-parking cycle.

For left-hand street parking, button 11 marked "L," FIG. 2, is depressed. All operations are the same as for right-hand parking except that switch-blade 153 is in control rather than switch-blade 151. Both switch-blades and spring contacts are identical in construction except that in operation the switch blades move in opposite directions through the action of reversing gear 52. This reversed motion of the switch-blade is necessary because the steering mechanism moves in opposite directions when parking on opposite sides of the street. Current flow now is through electrical connection D, FIG. 4, rather than through C.

The several safety features previously described in the operation of the hydraulic design are also applicable to this electrical design. The disengagement of the steering-mechanism operator from the car's manual steering mechanism by the use of a separate device is not necessary in this electrical design because when the device is in normal position, cone clutch 112 is in its neutral position disengaged from the motor drive.

An alternate combination-design using the hydraulic automatic-pilot shown in FIG. 3 and the electric steering-mechanism operator shown in FIG. 4 is possible by substituting hydraulic bellows 126 and 127, FIG. 5, for electric solenoids 117 and 118, FIG. 4. Oil lines 56' and 58' in FIG. 3 would be disconnected from cylinder 63 and connected instead through oil lines 83 and 84, respectively, to bellows 126 and 127, FIG. 5. Movement of cone assembly 112 would then be in response to oil flow into bellows 126 or 127.

*Potentiometer-Type Automatic-Pilot and Steering-Mechanism Operator*

An alternate design of electric automatic-pilot and steering-mechanism operator is shown in FIGS. 6, 6A and 7. All of the elements shown in FIG. 2 are retained but are not shown in FIG. 6 with the exception of elements corresponding to elements 40, 41, 42, 43, 44 and 45. In this design the automatic-pilot is essentially a potentiometer-type automatic balancing device.

Jaw clutch element 39, FIG. 2, drives jaw clutch element 200, FIG. 6A. Clutch element 200 drives switch arm 201 through shaft 202 which rotates in bearing 203. Multipoint selector switch 204 is electrically connected to potentiometer 205.

Potentiometer arm 207 of potentiometer 206, FIG. 6, is driven by shaft 208 which rotates in bearings 210 and 211. Shaft 208 is driven by gear 209 which in turn is driven by gear 160 mounted on steering wheel shaft 59.

The steering-mechanism operator is essentially an electric motor operating the steering wheel shaft through a reduction-gear and a reversing cone-type clutch. Steering-wheel shaft 59 and its driving gear 160 are rotated by pinion gear 108. Pinion gear 108 is fastened to shaft 109 which rotates in bearings 110 and 111 mounted in the mechanism frame. The cone-type reversing-clutch 112 drives shaft 109 through key 113 and is free to move axially on the shaft in accordance with the movements of shift lever 114. Shift lever 114 is held in neutral position by springs 115 and 116 and is caused to move by the action of a magnetic force, exerted by either solenoid 117 or 118. Cone clutch assembly 112 is caused to rotate by being forced against driving cone 119. Electric motor 121 drives cone 119 through a speed-reduction gear train 120. Relays 122 and 123 protect electric contacts 215, 216, 217 and 218 from arc damage by current flow.

Electric motor 121 and reduction gear train 120 could be replaced by a shaft drive of cone 119 direct from a suitable drive shaft of the vehicle such as the vehicle's engine crankshaft, camshaft, distributor drive shaft, or the like.

The mechanical and electrical operation of the automatic-pilot and steering-mechanism operator of FIGS. 6, 6A, and 7 during right-hand street parking are as follows: When jaw clutch 39 completely engages jaw clutch 200, contacts 36 and 37, FIG. 2, are closed thereby starting electric motor 121 through electrical connection E—F. In addition, an electrical potential is established across potentiometers 205 and 206 and relays 213 and 214 respectively.

The voltage between selector-switch arm 201 and one leg of potentiometer 205 (the upper leg as viewed in FIG. 6) is impressed on solenoid 213; a graphical illustration of the approximate characteristic of this voltage for right-hand parking is shown in FIG. 7. The magnitude of this voltage is related in a predetermined manner to the geographical position of the car and is comparable, in an electrical equivalent, to the contour of mechanical cam 41 of FIGS. 2 and 3. Each voltage prescribes a definite position of the steering wheels.

A voltage equal in magnitude to that of the voltage across solenoid 213 is sought to be impressed by steering wheel driven potentiometer 206 on solenoid 214. Potentiometer 206 seeks to impress an identical voltage across solenoid 214 thereby placing armature 212 in a magnetic force balance between the actions of solenoids 213 and 214. For example, if the steering wheels are turned too far to the right, the impressed voltage on solenoid 214 is greater than on solenoid 213 with the result that armature 212 tilts toward solenoid 214, closing contacts 215 and 216, closing relay 123, energizing solenoid 118, moving lever 114 and causing cone face 124 of cone clutch assembly 112 to bear against drive cone 119 thereby turning steering wheel shaft 59 to the left. If on the other hand the steering wheels are turned too far to the left, the impressed voltage on solenoid 214 is less than on solenoid 213 with the result that armature 212 tilts toward solenoid 213, closing contacts 217 and 218, closing relay 122, energizing solenoid 117 and moving shift lever 114 in an opposite direction which turns steering-wheel shaft 59 to the right. When the steering wheels are in their exact prescribed position, the voltage across solenoid 214 is equal to the voltage across solenoid 213 with the result that the magnitude of their individual magnetic force on armature 212 is identical. Under this condition of equal magnetic forces, stabilizing compression springs 219 and 220 maintain armature 212 in a neutral position whereby contacts 215 and 216 and 217 and 218 are open and cone clutch assembly 112 is in its neutral position.

When the car is driven against the curb, the driver releases parking button 10 which de-energizes solenoid 35, FIG. 2, causing spring 91 to force clutch 39 to separate from clutch 200 which opens contacts 19′, 36, and 37, and stops electric motor 121. Multipoint selector switch arm 201, FIG. 6, is returned to its neutral position by spring 221 with pin 222 (mounted on clutch 200) against pin 223 (attached to frame of mechanism). All components are thus brought back to their normal position ready for the next automatic-parking cycle.

For left-hand street parking, button 11 (marked "L"), FIG. 2, is depressed. All the operations are the same as for right-hand parking except that the connection of potentiometer 206 to solenoid 214 is reversed such that with potentiometer 206 being rotated in a given direction, the voltage impressed on solenoid 214 increases instead of decreases, or vice versa. The result is that the steering wheel is turned in an exact opposite direction to that turned during right-hand street parking.

The several safety features previously described in the operation of the hydraulic design are also applicable to this electrical design. The disengagement of the steering-mechanism operator from the car's manual steering mechanism by the use of a separate device is not necessary in this electrical design because when the device is in its normal position, cone clutch assembly 112 is in its neutral position disengaged from the motor driver.

The invention in its broader aspects is not limited to the specific combinations, improvements and instrumentalities described but departures may be made therefrom within the scope of the accompanying claims without departing from the principles of the invention and without sacrificing its chief advantages.

What is claimed is:

1. An automatic steering device for right or left-hand parking of dirigible vehicles comprising in combination, vehicle-driven forward-travel measuring means adapted to be set in operation by the operator for left or right-hand parking at a prescribed vehicle position relative to a parked vehicle for measuring a predetermined distance the moving vehicle must move forward parallel to the parked vehicle in accordance with a prescribed parking course before the moving vehicle is intended to be stopped and shifted into reverse for reverse-travel parking movement along said course; impulse-generating pilot means responsive to reverse-travel parking movements of the vehicle for generating position-prescribing impulses operative to effect a predetermined steering-wheel position for each geographical position of the vehicle in its reverse-travel parking movements, said pilot means comprising vehicle-driven programming means positionable in response to said parking movements for programming the generation of said position-prescribing impulses in accordance with said prescribed parking course, and position-sensing means responsive to the position of both said course-programming means and steering wheels for generating said position-prescribing impulses in accordance with said parking course and for interrupting said impulse at each said predetermined steering wheel position, whereby the steering wheels may be caused to be turned by said impulses, until their position is in balance with the position of said course-programming means at which point said impulses stop and steering-wheel movement ceases, said balance being only momentary since as the position of said programming means is changed by the steady movement of the vehicle, said position-sensing means is continuously sending impulses tending to restore a balance between the steering-wheel position and programming means position thereby to cause the steering wheels to follow automatically the parking movement prescribed by said programming means; and, steering-mechanism operating means responsive to the position-prescribing impulses of said position-sensing means for causing the steering mechanism to position the steering wheels in compliance with the prescribed impulses, said positionable programming means comprising vehicle-driven rotary-drive means including a normally stationary rotary driven-member and a rotary drive-member for driving said driven-member, said drive-member being normally out of driving engagement with said driven-member, and means actuated by said forward-travel measuring means for effecting driving engagement of said drive member with said driven-member at the termination of said forward-travel movement; and said forward-travel measuring means comprising rotary electric switching means adapted to be rotated by said rotary drive-means during said forward-travel movement, for actuating said driving-engagement means at the termination of said forward-travel movement, said forward-travel measuring means also comprising operator-controlled means for initially placing, and temporarily holding, said rotary electric switching means in driving engagement with said rotary drive-means.

2. An automatic steering device in accordance with claim 1 in which said normally stationary rotary-driven member includes a vehicle-driven cam means providing a cam profile determining said parking course.

3. An automatic steering device in accordance with claim 1 in which said normally stationary rotary-driven member includes a vehicle-driven electric rotary-switch-potentiometer device having a position-voltage profile that determines said parking course.

4. An automatic steering device in accordance with claim 1 in which said normally stationary rotary-driven member includes a vehicle-driven cam means providing a cam profile determining said parking course and in which said position-sensing means comprises hydraulic-valve means, said hydraulic-valve means including reciprocably mounted valve-body means constituting a cam-follower actuated by said cam means, and valve-stem means responsive to the position of the steering wheels.

5. An automatic steering device in accordance with claim 4 in which said position-sensing means also includes link means, said link means coupling said valve-stem means with said steering-mechanism for countering movement of said valve-body means by said cam means.

6. An automatic steering device in accordance with claim 5 and in which said steering-mechanism operating means comprises a double-acting spring-balanced hydraulic ram actuated by hydraulic impulses from said hydraulic valve means and means for linking said ram to said steering wheels to position the steering wheels in accordance with prescribed impulses.

7. An automatic steering device in accordance with claim 1 in which said normally stationary rotary-driven member includes a vehicle-driven cam means providing a cam profile determining said parking course, and in which said position-sensing means comprises electric-switch means having a reciprocably mounted switch-member constituting a cam-follower adapted to be actuated by said cam means, and a separate reciprocably mounted switch-member responsive to the position of the steering wheels.

8. An automatic steering device in accordance with claim 7 in which said position-sensing means also comprises link means coupling said separate switch-member with said steering-mechanism for countering movement of said cam-follower switch-member by said cam means.

9. An automatic steering device in accordance with claim 1 in which said normally stationary rotary-driven member includes a vehicle-driven electric rotary-switch-potentiometer device having a position-voltage profile determining said parking course, in which said position-sensing means comprises magnetically-actuated, steering wheel-reversing electric-switch means, a separate potentiometer device responsive to the position of the steering wheels, and a pair of independently energized solenoid means for magnetically actuating said steering wheel reversing electric-switch means, one of said solenoid means being actuated through said electric-rotary-switch-potentiometer device and the other through said separate potentiometer device, and in which said steering mechanism-operating means comprises electric motor means and a solenoid-actuated reversible driving means powered by said electric motor means and controlled by said steering wheel reversing electric-switch means, said separate potentiometer device and said rotary switch-potentiometer device being positionable to effect a condition of magnetic balance of said pair of independently energized solenoid means and electrical balance of no current flow in said reversing electric-switch means.

10. An automatic steering device in accordance with claim 9 in which said reversing electric-switch device comprises a spring-balanced, centrally-pivoted magnetic switching armature having a position of magnetic force balance between said pair of actuating solenoid means in which the circuits its switches control are open, said position corresponding to the electrical balance position of no current flow in said reversing electric-switch means as established by said rotary-switch-potentiometer device and said separate potentiometer device.

11. An automatic parking device in accordance with claim 1 in which said position-sensing means comprises separate, independently movable, mutually co-acting valving members having a zero impulse-sending position relative to each other in which said steering-mechanism operating means is maintained by the valving members in a condition of rest, one of said members being displaceable by said programming means, and in which said position-sensing means also includes means responsive to displacement of said steering wheels for effecting displacement of the other one of said members.

12. An automatic parking device in accordance with claim 1 in which said position-sensing means comprises separate, independently movable, mutually co-acting electric switching members having a zero impulse-sending position relative to each other in which said steering-mechanism operating means is maintained by the electric switching members in a condition of rest, one of said members being displaceable by said programming means, and in which said position-sensing means also includes means responsive to displacement of said steering wheels for effecting displacement of the other one of said members.

13. An automatic steering device in accordance with claim 1 in which said steering-mechanism operating means comprises electrically powered driving means and reversing clutch means for coupling said electrically-powered driving means to the steering-mechanism, said clutch means being controlled by impulses generated by said position-sensing means to position the steering wheels in accordance with the prescribed impulses.

14. An automatic steering device in accordance with claim 1 including a first solenoid-operated means for actuating said driving engagement means when said vehicle has moved forward said predetermined distance from said prescribed vehicle position, the solenoid circuit of said solenoid-operated means being normally open, and in which said rotary electric switching means is rotated by said rotary drive-means during said forward-travel movement, from a starting position in which the solenoid circuit of said solenoid-operated actuating means is "open," to a finishing position in which said circuit is "closed," for automatically closing the solenoid circuit of said solenoid-operated actuating means on reaching said finishing position, a second solenoid-operated means for initially placing and temporarily holding said rotary switching means in driving engagement with said rotary drive means in the starting position of said rotary switching means, and operator controlled switching means for closing the solenoid circuit of said rotary switching means at will.

15. An automatic steering device in accordance with claim 14 in which said operator-controlled switching means for closing the solenoid circuit of said rotary electric switching means comprises a depressible dash-board-mounted parking button, and in which said rotary driving-member is of a single-directional design effecting driving engagement of said rotary driven-member only during the vehicle reverse travel, whereby the steering device cannot function in the event of accidental or mal-operation in which the dash-board-mounted parking button is manually depressed while the vehicle is traveling with no intention by the operator for automatic parking.

16. An automatic parking device in accordance with claim 14 in which said rotary drive means further includes a friction clutch designed to slip when the torque it transmits exceeds a predetermined value.

17. An automatic steering device for right or left-hand parking of dirigible vehicles comprising in combination, vehicle-driven forward-travel measuring means adapted to be set in operation by the operator for left or right-hand parking at a prescribed vehicle position relative to a parked vehicle for measuring a predetermined distance the moving vehicle must move forward parallel to the parked vehicle in accordance with a prescribed parking course before the moving vehicle is intended to be stopped and shifted into reverse for reverse-travel parking movement along said course; impulse-generating pilot means responsive to parking movements of the vehicle for generating position-prescribing impulses operative to effect a predetermined steering-wheel position for each geographical position of the vehicle in its parking movements, said pilot means comprising vehicle-driven programming means positionable in response to said parking movements for programming the generation of said position-prescribing impulses in accordance with said prescribed parking course, and position-sensing means responsive to the position of both said course-programming means and steering wheels for generating said position-prescribing impulses in accordance with said parking course and for interrupting said impulses at each said predetermined steering wheel position, whereby the steering wheels may be caused to be turned by said impulses, until their position is in balance with the position of said course-programming means at which point said impulses stop and steering-wheel movement ceases, said balance being only momentary since as the position of said programming means is changed by the steady movement of the vehicle, said position-sensing means is continuously sending impulses tending to restore a balance between the steering-wheel position and programming means position thereby to cause the steering wheels to follow automatically the parking movement prescribed by said programming means; and, steering-mechanism operating means responsive to the position-prescribing impulses of said position-sensing means for causing the steering mechanism to position the steering wheels in compliance with the prescribed impulses, said programming means comprising a vehicle-driven electric-rotary-switch-potentiometer device having a position-voltage profile determining said parking course, and said position-sensing means comprising magnetically-actuated steering wheel reversing electric-switch means, a separate potentiometer device responsive to the position of the steering wheels, and a pair of independently energized solenoid means for magnetically actuating said electric-switch means, one of said solenoid means being actuated through said vehicle-driven electric rotary-switch-potentiometer device and the other through said separate potentiometer device.

References Cited in the file of this patent

UNITED STATES PATENTS

| | | |
|---|---|---|
| 1,570,547 | Avera | Jan. 19, 1926 |
| 1,905,717 | Jackson | Apr. 25, 1933 |
| 2,339,291 | Paulus et al. | Jan. 18, 1944 |
| 2,736,915 | Gilvarry et al. | Feb. 21, 1956 |
| 2,906,355 | Hirsch | Sept. 29, 1959 |